Figure 3:
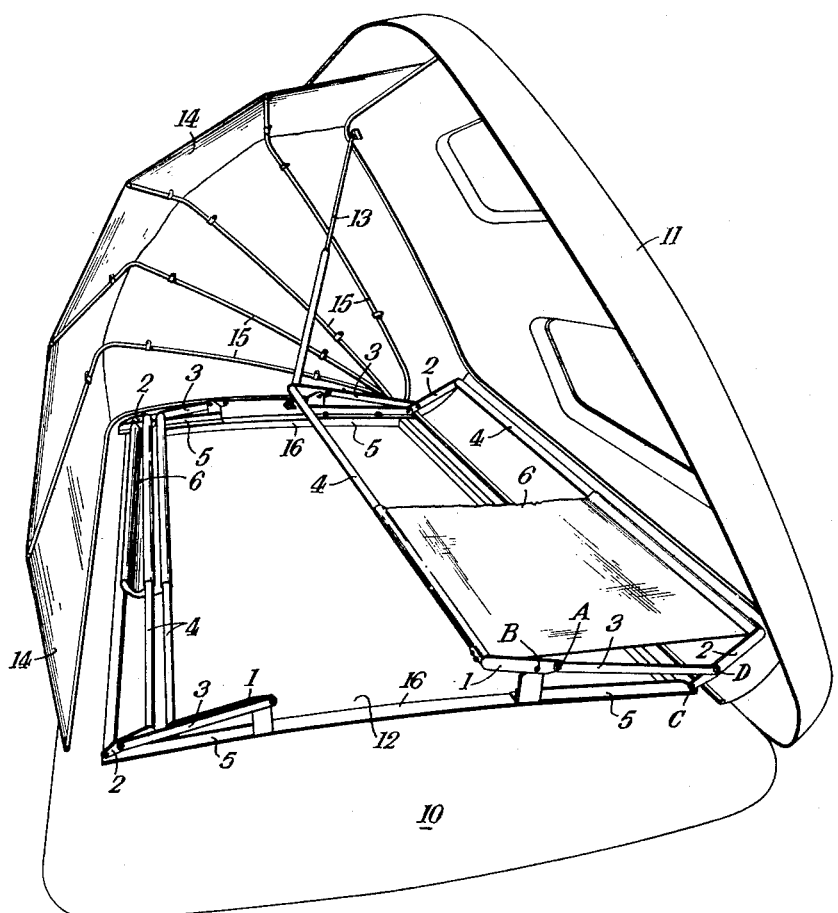

Feb. 6, 1962   C. H. W. CARTE   3,019,455
FOLDING BEDS
Filed Feb. 29, 1960   3 Sheets-Sheet 1
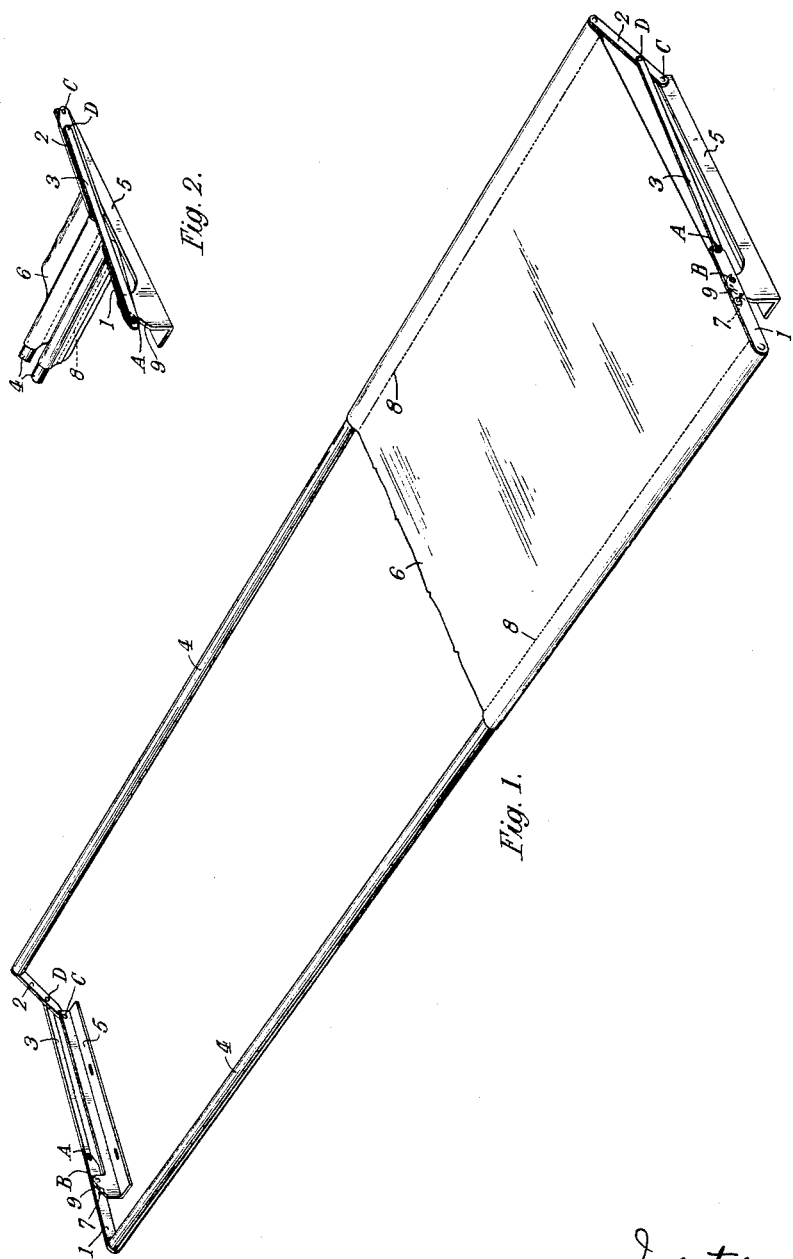
Inventor
Cecil Henry Walter Carte
By Moses, Nolte & Nolte
Attorneys Feb. 6, 1962
C. H. W. CARTE
3,019,455
FOLDING BEDS
Filed Feb. 29, 1960
3 Sheets-Sheet 3
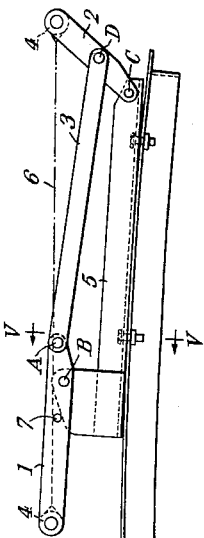
Fig. 4.
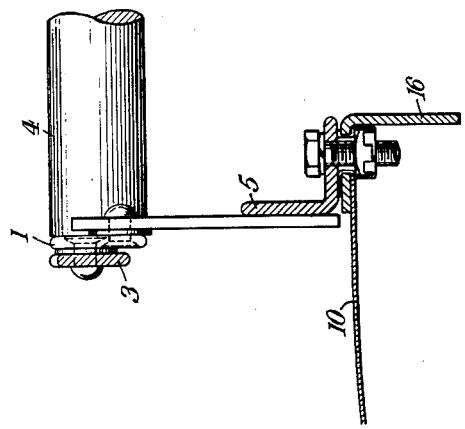
Fig. 5.
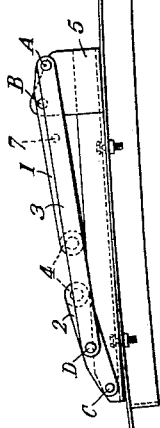
Inventor
Cecil Henry Walter Carte
By Moses, Nolte & Nolte
Attorneys 3,019,455
FOLDING BEDS
Cecil Henry Walter Carte, Folkestone, England, assignor to Martin Walter Limited, Folkestone, England
Filed Feb. 29, 1960, Ser. No. 11,812
Claims priority, application Great Britain Mar. 3, 1959
6 Claims. (Cl. 5—214)

This invention provides a folding stretcher bed which is particularly suitable for installation in vehicles, e.g. a motor van, caravan, omnibus or aircraft, but which is also capable of installation in a dwelling house or of use in a garden or in a summer house.

The folding bed according to the invention comprises a supporting base, a pair of parallel side members, a strip of flexible material constituting the supporting surface of the bed which extends between and is connected to the side members, and linkages at each end of the bed which connect the side members together and to the base, the linkages supporting the side members in spaced apart relation so as to hold the bed against collapse and being movable, by pressure on either side member, to cause the bed to fold and the side members to move into close proximity.

The invention will now be described in more detail by way of example with reference to the drawings in which, FIG. 1 is a perspective view of the bed in the extended position, FIG. 2 is a corresponding position showing one end of the bed in the folded position, FIG. 3 is a perspective view of the upper portion of a caravan provided with two folding beds of the kind shown in FIGS. 1 and 2, one bed being shown folded and the other extended, FIG. 4 is a corresponding end view of the beds on a larger scale, and FIG. 5 is a section on the line V—V in FIG. 4.

The bed shown in FIGS. 1 and 2 includes two longitudinal tubes 4 connected respectively at their opposite ends to end links 1 and 2. The links 1 and 2 are respectively mounted on pivot centres B and C on end frames 5 which constitute a supporting base for the bed, the centres B being intermediate in the lengths of the links 1 and the centres C being at the ends of the links 2. Linkage arms 3 are connected between each pair of links 1 and 2 on pivot centres A and D, located respectively at the ends of the links 1 and intermediately of the length of the links 2. A strip 6 of fabric, which constitutes the supporting surface of the bed, extends for the full length of the bed and is looped at each side over the tubes 4 and secured in position by stitching 8. The end frames 5 can be fixed as later described by suitable supports to the wall or roof of a vehicle or the like in which the bed is to be installed.

The bed can be folded from the extended position shown in FIG. 1 by applying upward pressure to one of the tubes 4. If the left hand tube 4 is so manipulated, the links 1 will turn clockwise about the centre B so, through the arms 3, causing the arms 2 to turn anti-clockwise about the centre C, thus approaching the tubes 4 closely together as indicated in FIG. 2. To extend the bed, the operator lifts and pulls towards him the tube 4 which is nearer to him, so moving the linkages in the reverse direction to the position shown in FIG. 1. As the bed approaches the extended position, the centres A of the linkages move over dead centre and rise above the centres B and C (as indicated more clearly in FIG. 3) and when the bed reaches the extended position stops 7 projecting from the links 1 and situated between the centres B and the associated tube 4 come into abutment with cooperating surfaces 9 on the frames 5. The bed is accordingly locked in the open extended position and prevented from collapsing under the weight of the occupant.

As will be appreciated the bed can be stowed compactly when not required for use. The bed can be manufactured in various lengths and widths to suit requirements, the control linkages at each end being so designed as to give the desired spacing between the longitudinal tubes in the extended and folded positions of the bed.

As an alternative to the arrangement described for locking the bed in the extended position, catches may be provided which are automatically actuated to lock the linkages to the supporting base to retain the bed in the extended position. The catches may be constituted by spring loaded pins which are manually withdrawn to the inoperative position when it is desired to fold the bed.

The folding bed according to the invention is particularly suited for inclusion in a vehicle, more particularly at roof level in a vehicle in which part at least of the roof can be elevated from its normal level to provide more head room in the vehicle. One such installation, in a vehicle having a hinged canopy roof, is illustrated in FIGS. 3–5.

These Figures show two folding beds of the kind just described fitted at roof level in a caravan having inside it seats (not shown) which can be folded so as to form a bed as described in United States Patent No. 2,859,798. For the purpose of giving added head room at night, the roof 10 of the caravan has a hinged portion 11 which can be hinged upwardly as shown in FIG. 3 to expose an aperture 12 in the roof. A strut 13 serves to hold the flap 11 in the up position. A canopy 14 of canvas guided by hoopsticks 15 rises with the flap 11 to the position shown in FIG. 3, and collapses for stowage beneath the flap when the latter is lowered. Two folding beds are provided on the roof beneath the flap 11 and can be moved from the folded position shown at the left hand side of FIG. 3 to the extended position shown at the right hand side of the Figure after the flap has been raised. The end frames 5 of the beds are fixed to angle sections 16 fixed to the roof at the ends of the aperture 12.

What I claim as my invention and desire to secure by Letters Patent is:

1. A folding bed comprising a supporting base, a pair of parallel rigid side members exending lengthwise of the bed, a strip of flexible material connected to said side members and extending between them to form the supporting surface of the bed, and linkages at the ends of the bed which connect the side members and the base and permit said side members to be separated and folded together, each of said linkages comprising end links pivoted to one of the side members and to the base and a centre link connecting said end links, and a pivot connecting the centre link to one of the end links being movable over dead centre in relation to a pivot connecting asid end link to the base as the side members are separated to retain said side members in spaced relation.

2. A bed according to claim 1, in which an end link of each linkage carries a stop which abuts the base when said end members are separated to extend the bed.

3. A folding bed comprising a supporting base, a pair of parallel rigid side members extending lengthwise of the bed, a strip of flexible material connecting said side members and extending between them to form the supporting surface of the bed and a collapsible bed supporting linkage at each end of the bed which is constituted by a plurality of links situated in a plane extending transversely to the length of the bed, each of said collapsible linkages including end links, interconnecting said side members and said base and a centre link connecting said end links at points distant from their connections to the base and said collapsible linkages being movable by manual application of pressure to one of said side members from an extended position, in which they maintain said side members in spaced apart relation, to a collapsed position in which said side members are in close proximity.

4. A folding bed comprising a pair of parallel rigid side members extending lengthwise of the bed, a strip of flexible material connecting said side members and extending between them to form the supporting surface of the bed, a pair of end support brackets and collapsible bed supporting linkages which connect said end brackets to said side members, each of said collapsible linkages being constituted by a plurality of links situated in a plane extending transversely to the length of the bed and including end links connecting said side members and the adjacent end brackets and a centre link connecting said end links and said collapsible linkages being movable by manual application of pressure to one of said side members from an extended position, in which they maintain said side members in spaced apart relation, to a collapsed position in which said side members are in close proximity.

5. A folding bed, comprising a supporting base, a pair of parallel side members extending lengthwise of the bed, a strip of flexible material constituting the supporting surface of the bed which extends between and is connected to the side members, and linkages at each end of the bed which extend transversely of the bed to connect the side members together and to the base, the linkages supporting the side members in spaced apart relation so as to hold the bed against collapse and being movable, by pressure on one of said side members, to cause the bed to fold and the side members to move into close proximity with said strip depending between them, each of said linkages including end links connected respectively to the side members, the first of said end links being pivoted at an intermediate point to the base and the other of said end links being pivoted at its end to the base, and an arm pivoted at one end to the end of the first end link and at its other end to a point intermediate in the length of the other end link, the point of connection of the arm to the first end link assuming, when the bed is extended, a position above the points of connection of the end links to the base.

6. A bed as claimed in claim 5, in which said first end links carry stops located between the associated side members and their points of connection to the base and arranged to abut the base when the bed is extended.

References Cited in the file of this patent

UNITED STATES PATENTS

| | | |
|---|---|---|
| 223,385 | Price | Jan. 6, 1880 |
| 441,922 | Bishop | Dec. 2, 1890 |
| 803,779 | Parlee | Nov. 7, 1905 |
| 948,613 | Lindemeyer | Feb. 8, 1910 |
| 1,436,984 | Follett | Nov. 28, 1922 |
| 1,579,508 | Brouyette | Apr. 6, 1926 |
| 1,871,871 | Woods | Aug. 16, 1932 |
| 2,243,659 | Thompson | May 27, 1941 |

FOREIGN PATENTS

| | | |
|---|---|---|
| 681,675 | Germany | Sept. 28, 1939 |

OTHER REFERENCES

"The Autocar," pages 543 and 544, published October 1957.